United States Patent

Zimbelmann

[15] 3,638,036
[45] Jan. 25, 1972

[54] FOUR-PHASE LOGIC CIRCUIT

[72] Inventor: Henry Peter Zimbelmann, East Setauket, N.Y.

[73] Assignee: General Instrument Corporation, Newark, N.J.

[22] Filed: Apr. 27, 1970

[21] Appl. No.: 31,944

[52] U.S. Cl. ....................307/205, 307/208, 307/221, 307/238, 307/251

[51] Int. Cl. ....................H03k 19/08, G11c 19/00

[58] Field of Search ..............307/205, 208, 221 C, 221, 238, 307/246, 251, 279, 304

[56] References Cited

UNITED STATES PATENTS

| | | | |
|---|---|---|---|
| 3,524,077 | 8/1970 | Kaufman | 307/205 X |
| 3,504,194 | 3/1970 | Eastman et al. | 307/304 X |
| 3,278,853 | 10/1966 | Hung Chang Lin | 307/251 X |
| 3,517,178 | 6/1970 | Herndon | 307/304 X |
| 3,299,291 | 1/1967 | Warner, Jr. et al. | 307/205 X |
| 3,457,435 | 7/1969 | Burns et al. | 307/205 X |
| 3,478,323 | 11/1969 | Rado | 307/304 X |
| 3,521,242 | 7/1970 | Katz | 307/279 X |
| 3,539,823 | 11/1970 | Zuk | 307/205 X |
| 3,502,908 | 3/1970 | Christensen | 307/205 X |

OTHER PUBLICATIONS

Sidorsky, MTOS Shift Registers, General Instrument Corporation Application Notes, Dec. 1967, pp. 1–7.

Boysel et al., Multiphase Clocking Achieves 100–N sec. MOS Memory, Electron Design News, June 10, 1968, pp. 50– 52, 54, 55.

*Primary Examiner*—Stanley T. Krawczewicz
*Attorney*—James and Franklin

[57] ABSTRACT

A four-phase logic circuit characterized by a double inverter comprising a series of FETs utilizing unconditional charge and conditional discharge of the output node. Only one FET is interposed in the discharge path. The discharge FET is controlled by a clock pulse connected through a FET which is in turn controlled by the data signal.

18 Claims, 5 Drawing Figures

INVENTOR
HENRY PETER ZIMBELMANN
BY James and Franklin
ATTORNEY

INVENTOR
HENRY PETER ZIMBELMANN
BY James and Franklin
ATTORNEY

INVENTOR
HENRY PETER ZIMBELMANN

BY Jameson and Franklin
ATTORNEY

FOUR-PHASE LOGIC CIRCUIT

The present invention relates to an improved four-phase logic circuit, and particularly to such a circuit utilizing switching devices and discrete or effective capacitances capable of being rapidly charged and discharged.

Logic circuits of the type described are basic building blocks of digital data processing systems. In circuits of this type, the data is stored at one or more nodes at either of two discrete signal levels corresponding to either a false or logic "0" condition or a true or logic "1" condition. The circuit is adapted to perform sequential logical operations upon incoming data and provide output data in accordance with such operations. Such circuits may be used as shift registers, counters, adders and in various gates for performing specific logical operations.

In recent years, a new technology has been developed in the semiconductor art in which a plurality of switching devices are fabricated to form an integrated circuit on a chip of semiconductor material. In the fabrication of these circuit chips, and particularly where utilized in logic circuits, insulated gate field effect transistors (FETs) have been found to be particularly effective as high-speed switching devices. These transistors are formed on a chip of semiconductor material by performing appropriate operations on suitably doped regions of the semiconductor substrate to produce the basic elements forming an individual FET. These elements include a control terminal generally termed the gate, and a pair of output terminals generally termed the source and drain, respectively. In one type of FET if the signal at the gate is negative with respect to its output terminals, the output circuit between the source and the drain is closed, that is, the device is in the "on" state. If the signal at the gate is positive with respect to its output terminals, the output circuit is characterized by an extremely high-impedance equivalent to an open circuit, that is, the device is in the "off" state. Another type of FET functions in just the opposite fashion. Thus, the FET operates as a high-speed switching device controlled by the signal level applied to its gate terminal. For purposes of explanation throughout this specification, a logic "0" signal level refers to a level insufficient to turn a device "on" when applied to its gate terminal and a logic "1" level refers to a level which is sufficient to turn a device "on" when applied to its gate terminal. No external bias signals are required to operate the FET as a switching device. These devices are well suited for the mechanization of complex logic functions on a single substrate of semiconductor material by virtue of their extremely small size, low-power requirement and ease of fabrication in large quantities.

It has been found that in logic circuits using FETs optimum operation is obtained by the use of four-phase logic timing signals in which the timed control of the various logic circuits is determined by the operation of four sequential clock signals each having a specified time and phase relation with respect to one another. The use of such four-phase logic control enables the use of a higher concentration of switching devices in a given chip area, and also reduces the power dissipation of the circuit by as much as one-half, as compared to that of conventional two-phase logic circuits. As a result, the utilization of four-phase logic circuits comprising FETs as switching devices has proved to be highly successful in providing high-speed operation, increased switching capacity and decreased power dissipation.

In addition to the use of four-phase logic timing signals it has been found particularly effective to perform logical operations by means of unconditionally charging a circuit node through one path and conditionally discharging said node through a different path determined by the presence or absence of a negative signal on the gate terminal of a FET disposed in such discharge path. Advantage is taken of the low-"on" resistances of the FET switching devices to charge the node capacitance to a negative voltage through one path and discharge it to ground through a different path. The absence of a direct path between the negative voltage and ground is a key factor in power saving and reduction of device area. The infinite "off" resistance of FET devices allows the charge to be stored on a capacitor, or as is usually the case, on the inherent effective capacitance of the FET device itself, thereby maintaining the logic level. The charge-discharge time determines the high-frequency limit while the charge leakage determines the low-frequency limit. Once the capacitor has been fully charged, current flow ceases and quiescent power dissipation is zero.

While FETs are eminently suited for logic circuits of the type described, such devices have an inherent dynamic resistance which places limitations upon their use in such circuits. A primary factor in determining speed of response is the resistance through the discharge path—the higher that resistance the lower is the speed of response. In previous circuits of the type described, it has been found necessary to interpose at least two switching devices between the output node and ground, one for conditional discharging and the other to provide isolation between the signal levels at different output nodes within the circuit. As a result the resistance through the discharge path is relatively high—it consists of the sum of the "on" resistances of the two switching devices. This severely limits the speed of response. The use of larger devices to overcome this limitation may hamper circuit design and fabrication by decreasing the number of such devices which can be fabricated on a single clip of semiconductor material. In addition to slowing response, the power dissipation is high.

The present circuit overcomes these disadvantages by providing only one FET in the discharge path thus cutting down the discharge resistance and response time by at least one-half. Briefly, the circuit of the present invention comprises an output node which is unconditionally charged negative through a first switching device during the first clock pulse. A second switching device is adapted to connect the output node to ground during the second clock pulse if the data input is negative. Accordingly, the second clock pulse is applied to the gate terminal of the second switching device. A third switching device connected at its gate terminal to the data input signal is interposed between the gate terminal of the discharge switching device and the source of the second clock pulse. Thus, during the interval defined by the second clock pulse, the discharge switching device is closed if and only if the data input signal is negative. The circuit thus functions as an inverter and provides at the output the complement of the signal provided at the input. Two of such circuits may be connected in series to form a double inverter shift register stage. The circuit is also widely useful to form various other logic configurations having one or more data inputs thereto. Thus, for example, two data input devices may be connected in series to form an "AND" gate or in parallel to form an "OR" gate. It will be apparent that the data input configuration may be varied as desired to form a circuit for performing various logical operations and combinations thereof.

It is, therefore, a primary object of the present invention to provide a four-phase logic circuit having an improved response time.

It is a further object of the present invention to provide an improved four-phase logic circuit for performing a logical inversion by means of an unconditional charge and a conditional discharge through a single-switching device during selected intervals.

It is still a further object of the present invention to provide a logic circuit for changing the logic of the output as a function of the inputs during selected intervals of time.

To the accomplishment of the above, and to such other objects as may hereinafter appear, the present invention relates to a four-phase logic circuit as defined in the appended claims and as described in this specification, taken together with the accompanying drawings, in which:

Purely by way of illustration, the basic logic circuit will be here described specifically with regard to its use in a shift register stage, it being understood that the circuit has wide applications in performing various and complex logical operations.

Shift registers are well-known logic components. They may be characterized as circuits which receive a data signal and, controlled by a shifting or clock signal, transfer that data signal to another circuit of the same or different character. A plurality of such circuits may be connected together, the data signal finally emerging from the last stage after it has been shifted serially from circuit to circuit through the entire array during a series of clocked intervals. Shifting of this type is required, for example, during multiplication before adding partial products or in converting from serial to parallel computer operation or vice versa.

Figure 1:
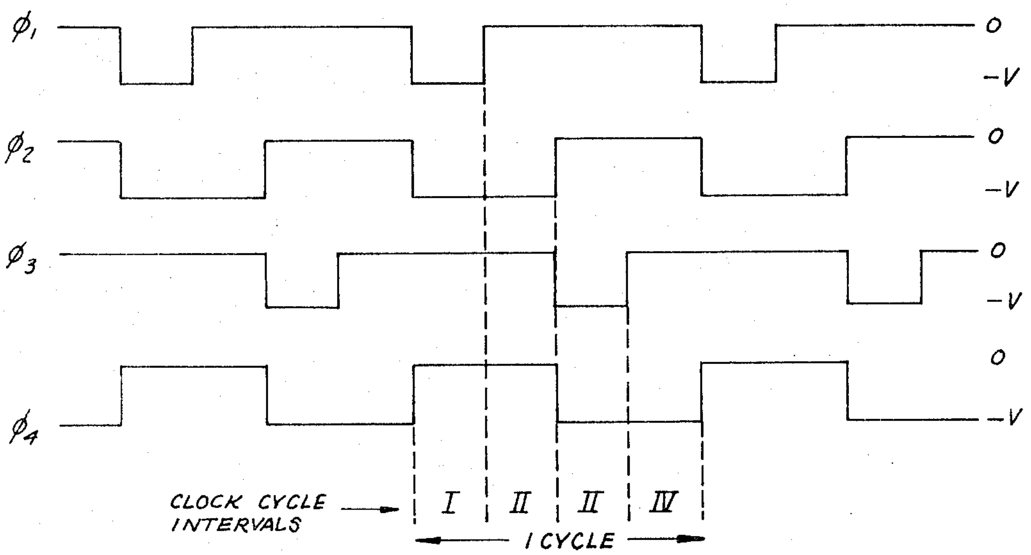
FIG. 1 is a graphical representation of the time relationship between the four clock phases utilized in the present circuit.

FIG. 1 illustrates the time relation between the four clock signals used in the operation of the present circuit, time being represented on the horizontal axis and the signal amplitude being represented on the vertical axis. By way of example, the clock signals may be considered as being normally at ground, and as having a recurring negative operative pulse of $-V$ volts. The interval during which the signal is negative is designated the "time" of that clock phase, that is, "$\phi_1$ time" indicates that interval during which the $\phi_1$ clock signal is negative. Clock signals $\phi_1$ and $\phi_3$ are unique or nonoverlapping and the other two signals $\phi_2$ and $\phi_4$ occur during the period of one of the unique phases respectively and extend in time until the onset of the following unique clock phase. As illustrated, a complete cycle comprises four separate clock cycle intervals designated I–IV. Interval I encompasses the $\phi_1$ time and $\phi_2$ time overlap; interval II encompasses only $\phi_2$ time; interval III encompasses the $\phi_3$ time and $\phi_4$ time overlap; and interval IV encompasses only $\phi_4$ time. While it is possible to separately generate each of the four timed clock pulses externally, it is highly desirable to reduce the number of the external clock generating circuits by supplying only two externally generated clocks and generating the overlapping clock phases from them by means of circuitry which can be readily incorporated into the integrated circuit assembly in which the control circuits are also formed. An example of such a clock generating circuit is that described in a copending application entitled "Clock Generator," filed in the name of Richard B. Rubinstein, et al., on Oct. 10, 1968 and assigned to the assignee of the present application.

In the dynamic shift register each stage receives clock pulses which are effective on each clock pulse cycle to shift or transfer data from one stage to a succeeding stage. The period of each clock pulse cycle is usually designated as one "bit" of data transfer, so that each data shifting operation is performed during each bit. That unit of a shift register capable of introducing a time delay of one "bit" to a signal is also referred to as one "bit" of the register. Thus for a shift register having 10 bits, the data would appear at the output stage 10 bits after it is applied to the input stage of that register, that register being designated as a 10-bit register.

Figure 2:
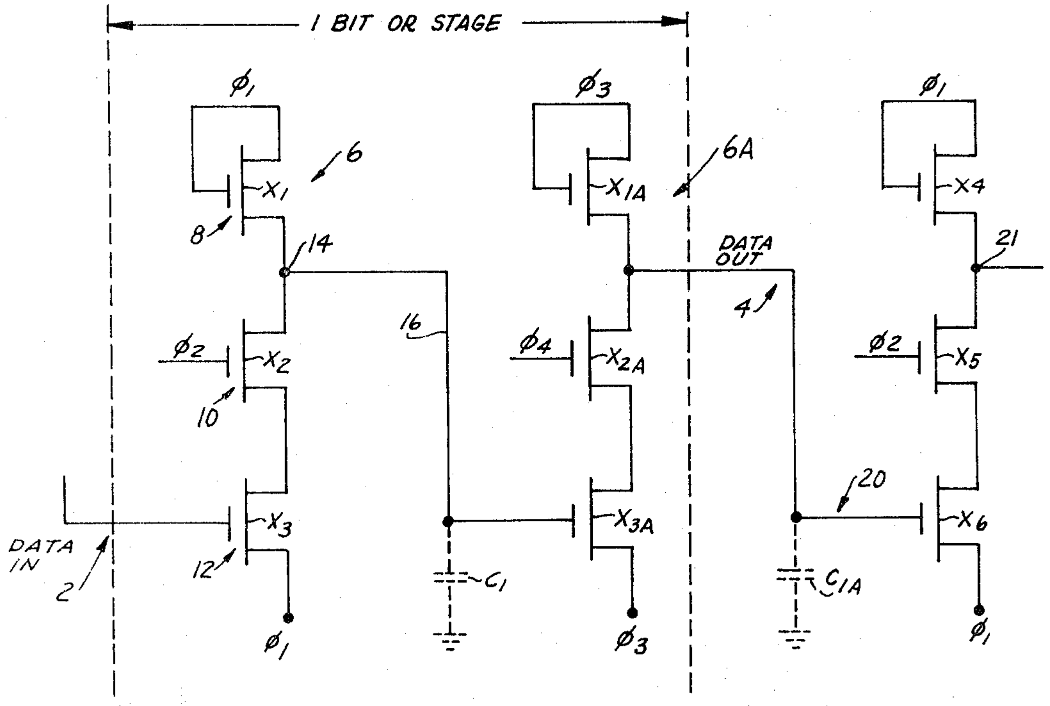
FIG. 2 PRIOR ART
FIG. 2 is a circuit diagram of a prior art four-phase shift register circuit utilizing unconditional charge and conditional discharge but having two switching devices in the discharge path.

FIG. 2 illustrates a prior art four-phase shift register circuit. Only one bit is illustrated in toto, it being understood that as many such bits as desired may be connected, serially or otherwise, in order to produce the desired degree of delay, the desired number of memory stages, or to satisfy any other external requirement. Each bit comprises an input port 2, an output port 4, and a pair of serially connected identical inverter stages generally designated 6 and 6A, the devices in inverter circuit 6A being designated by like numerals to those of inverter stage 6 except for the addition of the letter A. Each inverter circuit comprises three electronic switch devices $X_1$, $X_2$, and $X_3$, connected in series. $X_2$ and $X_3$ function as FETs. $X_1$ may structurally correspond to a FET, but it functions as a diode—it is conductive or nonconductive depending on the voltages applied across its output electrodes. One output circuit terminal and the gate terminal of $X_1$ are tied to the $\phi_1$ clock signal source. Thus, during interval I, $X_1$ is conductive and is adapted to transmit a negative signal to its other output terminal. FET $X_3$ receives the $\phi_1$ clock signal at its lower output terminal, its gate terminal being connected to the data input port 2. The $\phi_2$ clock signal is applied to the gate of FET $X_2$. The upper and lower output terminals of $X_3$ and $X_2$ are connected to one another, as are the upper and lower output terminals of $X_2$ and $X_1$, respectively.

An inverter output node 14 of the inverter circuit 6 is defined at the junction between the output terminals of $X_1$ and FET $X_2$. Inverter stage 6A comprises switches $X_{1A}$, $X_{2A}$ and $X_{3A}$ connected in series in a manner identical to that described with regard to inverter stage 6 with the exception that clock phases $\phi_1$ and $\phi_2$ are here replaced by clock phases $\phi_3$ and $\phi_4$, respectively. Lead line 16 connects output node 14 of transfer stage 6 to the gate terminal of FET $X_{3A}$. The signal at node 14 is stored by capacitor $C_1$ illustrated in broken lines and representing the effective capacitance at node 14 due to the combined interelectrode capacitances of $X_1$ and FETs $X_2$ and $X_{3A}$. A discrete capacitor $C_1$ may, of course, be used if it is desired to increase the effective capacitance at node 14. During interval I capacitor $C_1$ is unconditionally precharged negative through $X_1$. If the incoming data at data input port 2 is a logic "1" signal, it can be seen that there is an additional charging path through FETs $X_2$ and $X_3$ both of which will be conductive during interval I. It should be noted that this additional charging path is unnecessary for the complete charging of capacitor $C_1$. During interval II capacitor $C_1$ will be discharged through conductive FETs $X_2$ and $X_3$ if the incoming data at input port 2 is at logic "1." If, however, the data input is at logic "0," FET $X_3$ will be rendered nonconductive and capacitor $C_1$ will be effectively isolated from ground by nonconductive switches $X_1$ and $X_3$ thereby maintaining its negative charge. It will be apparent that transfer stage 6 functions as an inverter, i.e., the signal on node 14 established during interval II is the complement of the input signal at data input port 2 during interval I. During interval III data output port 4 is unconditionally charged negative via $X_{1A}$, If the signal at node 14 (stored on capacitor $C_1$) is at logic "1" (original data input at logic "0") there will be an additional charging path through FETs $X_{2A}$ and $X_{3A}$, again not essential. During interval IV capacitor $C_{1A}$ is discharged through FETs $X_{2A}$ and $X_{3A}$ if a charge is left on capacitor $C_1$, that is, if $C_1$ is at logic "1" (original data input at logic "0") If, however, capacitor $C_1$ has been previously discharged to logic "0" during interval II (original data input at logic "1" ) then FET $X_3$ will be rendered nonconductive and the negative charge of capacitor $C_{1A}$ and data output port 4 will remain isolated from ground by means of nonconductive FEts $X_{1A}$ and $X_{3A}$. Thus the data signal at output node 4 at the termination of interval IV corresponds to the signal at data input port 2 at the beginning of interval I.

It will be noted that the data input port 2 is effectively isolated from inverter node 14 at the termination of interval II (onset of $\phi_3$ time) because FET $X_2$ then becomes and stays nonconductive. Thus a series of shift register stages may be connected together in series as illustrated by connecting the data output port 4 of one register stage to the data input port 20 of another identical register stage, the data signal at the input to one shift register stage being transferred to the inverter node of that stage and isolated from the input port thereof prior to the introduction of a new data at the input port. It will be apparent that in both inverter stages 6 and 6A the discharge path to ground comprises two FETs $X_2$ and $X_3$. As previously noted, the discharge time is a function of the resistance through the discharge path. Thus, the more FETs interposed in the discharge path, the higher the discharge path resistance and the slower the response time.

An additional disadvantage of this prior art circuit results from the inherent coupling capacitance between the gate and the source of an insulated gate field effect transistor. Thus, at the termination of $\phi_3$ time the positive going edge of clock pulse $\phi_3$ applied to $X_{1A}$ will have an adverse coupling capacitance effect upon a negative data signal stored at data output port 4. Similarly, at the termination of $\phi_4$ time (the onset of $\phi_1$ time) the positive going edge of clock pulse $\phi_4$ applied at the gate terminal of FET $X_{2A}$ will have a similar adverse coupling capacitance effect upon a negative data signal stored at data output port 4. The same effect applies to the inverter node 14. The combined effect of these coupling capacitances is to reduce the charge stored at the output port and thereby reduce the driving signal on a subsequent stage. This reduction may be great enough to prevent the device, driven by such output node (in this case $X_6$) from turning "on" when the data at the output is ostensibly at a logic "1" condition. Even if the reduction in charge is insufficient to prevent the device from turning on, the lower drive will be perpetuated through the circuit by increasing the resistance of the device and thus restricting the effective discharging path throughout. Thus, the lower drive on FET $X_6$ will reduce the discharge of node 21 during interval II and so on down the line.

Figure 3:
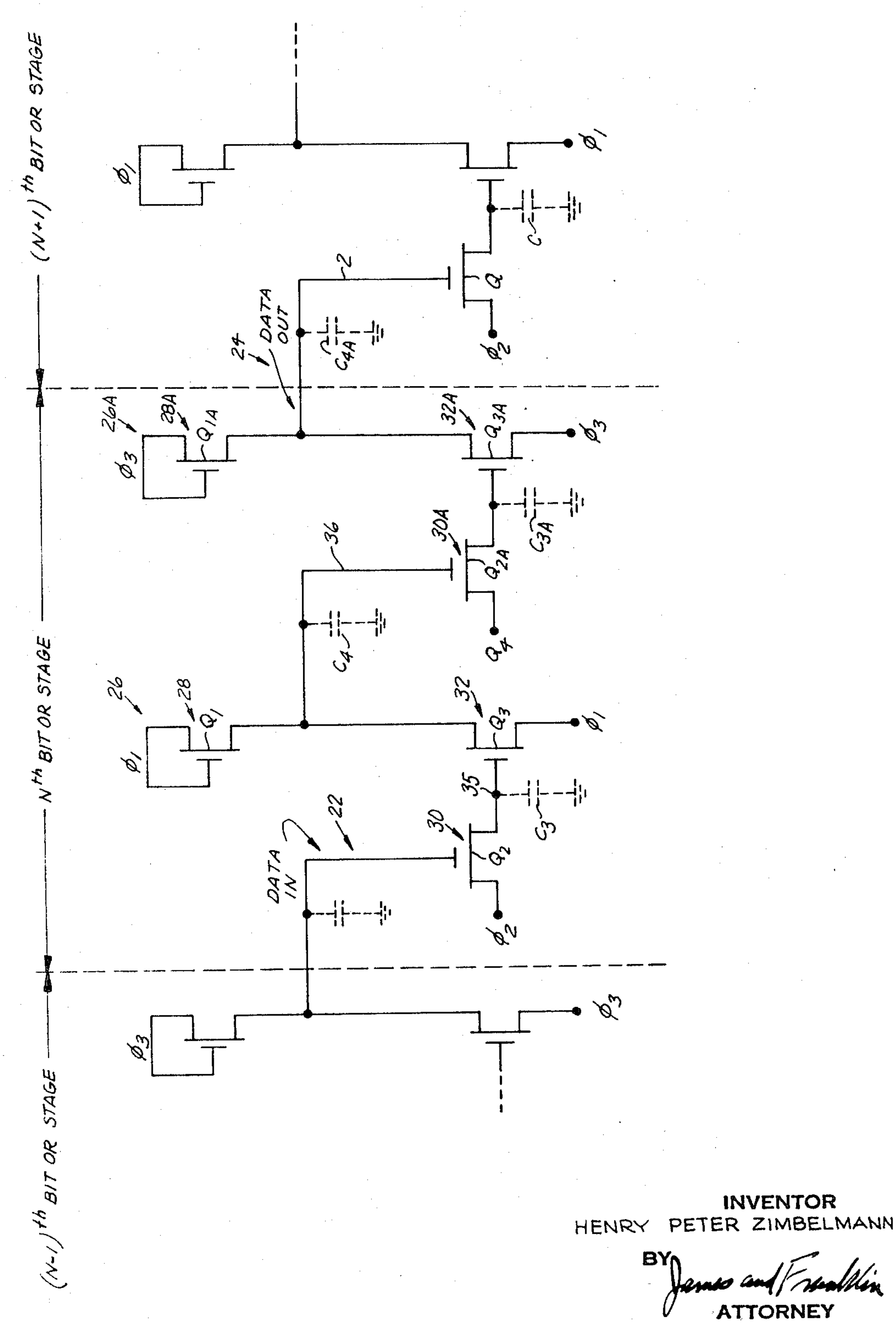
FIG. 3 is a circuit diagram of a shift register utilizing the circuit of the present invention.

A shift register utilizing the circuit of the present invention is schematically illustrated in FIG. 3. Again as there indicated any number of such registers may be connected together to form any number of bits or stages, the *N*th stage being indicated between the dotted lines and connected between the output of the (*N*–1)th stage and the input of the (*N*+1)th stage. Each stage comprises an input port 22 and an output port 24 between which are connected two inverter stages generally designated 26 and 26A, the devices in inverter circuit 26A again being designated by like numerals to those of inverter circuit 26 except for the addition of the letter A. Each inverter circuit comprises three electronic switch devices here specifically disclosed as effective diode $Q_1$ and field effect transistors $Q_2$ and $Q_3$, respectively. One output circuit terminal and the gate terminal of $Q_1$ are tied to the $\phi_1$ clock signal source. Thus, during $\phi_1$ time $Q_1$ is conductive and transmits a negative signal to its other output terminal. The output circuit of FET $Q_3$ is connected in series with the output circuit of $Q_1$ and the $\phi_1$ clock signal source. The output circuit of FET $Q_2$ is connected between the $\phi_2$ clock signal source and the gate terminal of FET $Q_3$, the gate terminal of FET $Q_2$ being controlled by the data input port 22.

An inverter node 34 of inverter circuit 26 is defined at the junction between the output terminals of $Q_1$ and FET $Q_3$. Inverter circuit 26A comprises $Q_{1A}$ and FETs $Q_{2A}$ and $Q_{3A}$ connected in a manner identical to that described with regard to the devices of inverter circuit 26 with the exception that clock phases $\phi_1$ and $\phi_2$ are there replaced by clock phases $\phi_3$ and $\phi_1$, respectively. A lead line 36 connects inverter node 34 to the gate terminal of FET $Q_{2A}$. Capacitor $C_3$ and $C_4$ represent the effective capacitances at node 35 and node 34, respectively, due to the combined interelectrode capacitances of the FETs to which said nodes are directly connected as previously described. Again discrete capacitances may be provided if desired.

During interval I capacitor $C_4$ is unconditionally charged negative through $Q_1$. If data input port 22 is at a logic "1" level, an additional charging path exists through FET $Q_3$ which is rendered conductive by the application of the $\phi_2$ clock phase to its gate terminal through FET $Q_2$. This latter charge path is not essential for the charging of capacitor $C_3$. At the same time during this interval, capacitor $C_3$ is also charged negative through FET $Q_2$. If, however, the data input node 22 is at a logic "0" level during $\phi_1$ time, capacitor C3 will be isolated from the $\phi_2$ clock signal by FET $Q_2$ and consequently FET $Q_3$ will be nonconductive. During interval II node 34 is conditionally discharged through FET $Q_3$ depending upon the logic level at data input port 22. Thus, if the data input signal is at a logic "1" condition, FET $Q_2$ will be conductive and capacitor $C_2$ will remain charged. FET $Q_3$ will remain conductive and the charge at node 34 and capacitor $C_4$ will be discharged through FET $Q_3$. If the data input signal is at a logic "0" condition, FETs $Q_2$ and $Q_3$ will remain nonconductive and thus $Q_1$ and FET $Q_3$, both nonconductive at this time, will prevent the discharge of capacitor $C_4$. Again it will be apparent that the charge on capacitor $C_3$ at the end of interval II Will be the complement of the charge on the data input port 22 during interval I.

During interval III, capacitor $C_{4A}$ is unconditionally charged to a logic "1" condition through $Q_{1A}$. If capacitor $C_4$ was left charged after interval II then FET $Q_{2A}$ is conductive and capacitor $C_{3A}$ is charged by clock phase $\phi_4$. This in turn will render FET $Q_{3A}$ conductive and thus provide an additional charging path for capacitor $C_{3A}$. Again it should be noted that this latter charge path is not essential for the charging of capacitor $C_{3A}$. If capacitor $C_4$ was in the logic "0" state at the termination of interval II, then FET $Q_{2A}$ will be nonconductive, capacitor $C_{3A}$ will remain nonconductive, isolating capacitor $C_{4A}$ from ground. During interval IV, $Q_{1A}$ is rendered nonconductive. If capacitor $C_4$ was left charged (in the logic "1" condition) at the termination of interval II, then FET $Q_{2A}$ remains conductive, and capacitor $C_{3A}$ remains charged (in the logic "1" condition) maintaining FET $Q_{3A}$ conductive. Thus, capacitor $C_{4A}$ will be discharged during this period through FET $Q_{3A}$. If, however, at termination of interval II capacitor $C_4$ had been discharged (to the logic "0" condition) FET $Q_{2A}$ would remain nonconductive and capacitor $C_{3A}$ would remain in the logic "0" condition maintaining FET $Q_{3A}$ nonconductive, thereby preventing the discharge of capacitor $C_{4A}$. It can be seen that the signal at output node 24 at the termination of interval IV is the reconstruction of the "-data in" signal during interval I. The data has, therefore, been shifted in two stages from the data input node 22 to the data output node 24 during one clock cycle.

By applying suitable logic configurations to the data input port, it is possible to perform a variety of logical operations with the circuit of this invention. By way of example FIGS. 4 and 5 show data input arrangements upon which the circuit is adapted to perform the logical "AND" and "OR" operations, respectively.

Figure 4:
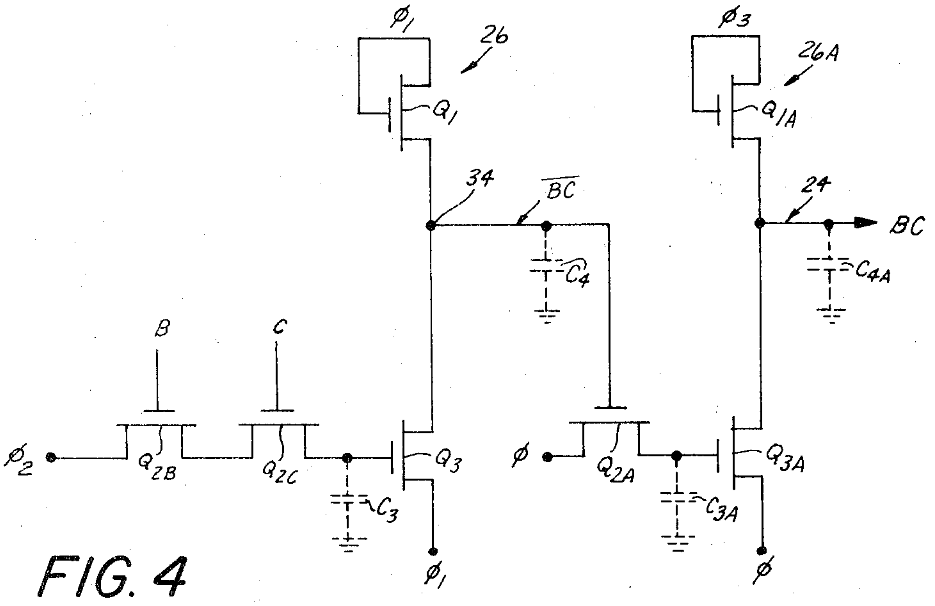
FIG. 4 is a circuit diagram of an "AND" gate utilizing the circuit of the present invention.

Referring to FIG. 4, two data input signals B and C are applied to the gate terminals at two serially connected FETs $Q_{2B}$ and $Q_{2C}$, respectively. It will be noted that when either of input signals B or C are false the $\phi_2$ clock signal is cut off from the gate of FET $Q_3$ and capacitor $C_4$ which has been precharged during interval I through $Q_1$, is prevented from discharging through FET $Q_3$ during interval II. Thus, the signal at inverter node 34 at the end of one-half of a clock cycle is the NAND function ($\overline{BC}$) of data input signals B and C, that is to say, the output at node 34 is false only if both input signals B and C are true. During the second half of a clock cycle (intervals III and IV) the second inverter stage 26A will provide at the output port 24 the complement of the signal at node 34, that is, the "AND" function (BC) of input signals B and C; the output is true only when both inputs are true.

Figure 5:
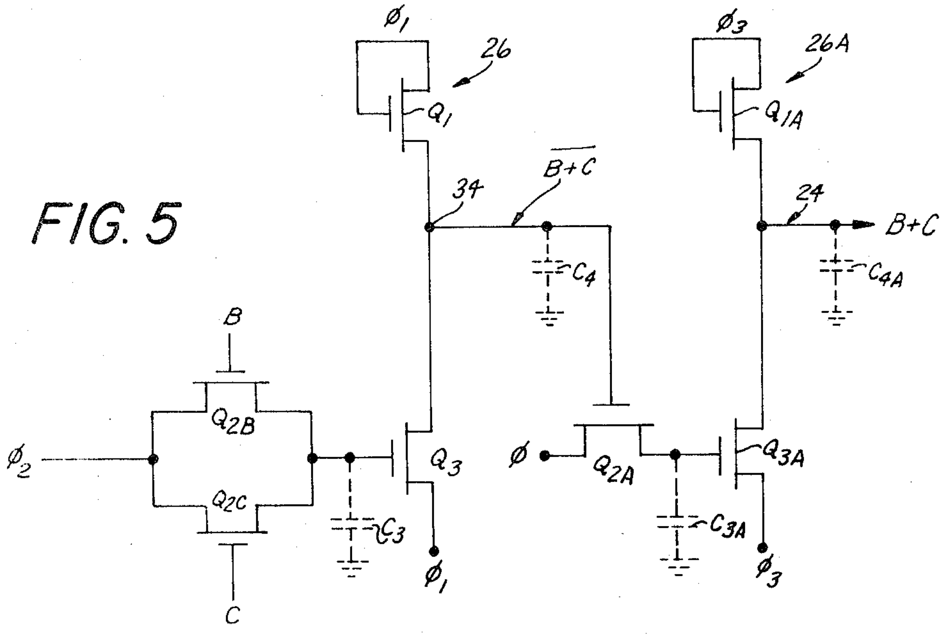
FIG. 5 is a circuit diagram of an "OR" gate utilizing the circuit of the present invention.

The "OR" gate embodiment shown in FIG. 5 is similar to the "AND" gate of FIG. 4 except that in this embodiment the input FETs $Q_{2B}$ and $Q_{2C}$ have their output circuits connected in parallel. Thus, the $\phi_2$ clock signal will reach the gate terminal of FET $Q_3$ if either of FETs $Q_{2B}$ or $Q_{2C}$ are conductive during $\phi_2$ time. Thus, the signal at inversion node 34 will be false and that at output port 24 will be true if either of input signals B or C is true.

It will be apparent from the foregoing that any number of input FETs may be connected in series or parallel or combinations thereof to provide an unlimited number of logical operations. Moreover, as with the register stage previously described, any number of gates may be connected in any desired manner to perform more complex operations.

As previously noted, speed of operation is determined at least in part by the impedance through the discharge path. The response time of the present circuit is, therefore, increased significantly over prior art circuits of this type by virtue of the provision for only one FET in the discharge path. It should be noted, however, that another factor affecting impedance of the discharge FET is the voltage applied to its gate. In my new circuit the gate of discharge FET $Q_{3A}$ is connected to the drain of FET $Q_{2A}$, the source of which is impressed with the $\phi_4$ clock signal. Thus, for example, if FET $Q_2$ ($Q_{2A}$) is "on" during $\phi_2$ ($\phi_4$) time the gate of FET $Q_3$ ($Q_{3A}$) receives a voltage which is less negative than the $-V$ clock pulse by one threshold voltage drop, resulting in an increase in the output impedance of FET $Q_3$ ($Q_{3A}$). This is so whether or not the data input signals at ports 22 or 36 are applied directly from a $-V$ voltage source. In the prior art circuit of FIG. 2 it can be seen that if the data input signal is $-V$, both discharge FETs are actuated at their gates directly by a $-V$ voltage.

It has been found that the increase in discharge impedance resulting from the one threshold voltage drop between the clock signal pulse and the gate terminal of the discharge FET in my circuit is greatly outweighed by the decrease in impedance resulting from the elimination of one discharge FET. Moreover, the aforementioned increase is only a factor at the input to the first stage of a register or series of logic gates, since all other stages, including inverter stages, receive the signal at the output of the previous stage, which as can be seen is always one threshold voltage drop less negative than $-V$ voltage.

It will be noted that my new circuit also greatly reduces the previously mentioned adverse coupling capacitance effect at the precharged output nodes 34 and 24 again by a factor of up to one-half.

Thus, it will be recalled that in the prior art circuit shown in FIG. 2, the positive going edges of the $\phi_3$ and $\phi_4$ clock phases will be coupled to the output node 4 through the interelectrode capacitances of $X_{1A}$ and $X_{2A}$. If the negative precharge on node 4 is discharged during interval IV (i.e., FET $X_{3A}$ is conductive) this coupling capacitance will have no adverse effect on the logic at node 4. However, if node 4 is to remain charged at a logic "1" condition (FET $X_{3A}$ nonconductive) the coupling of the positive going edges of the $\phi_3$ and $\phi_4$ clock pulses will have the effect of decreasing the negative charge at node 4. If this coupling capacitance is great enough it may reduce the charge at node 4 enough to change its logic; that is to say, the charge will be depleted to a value insufficient to turn on the input FET (here $X_6$) of the next stage. At the very least, the impedance of the discharge path of the next node (here 21) will be significantly increased.

By contrast, in the circuit of my invention, only the precharged switches ($Q_1$ or $Q_{1A}$) provide a coupling capacitance to the output nodes (34 and 24) when the negative charge is to be retained, since in such a case the discharge FET ($Q_3$ or $Q_{3A}$) must be in the "off" state and therefore isolated from its actuating clock pulse $\phi_2$ ($\phi_4$).

While only three embodiments of the present invention have been here specifically described, it will be apparent that many variations may be made therein, all within the scope of the instant invention as defined in the following claims.

I claim:

1. A logic circuit for performing a logical operation on one or more data signals during a period defined by first and second clock intervals, comprising a data input having one or more data input nodes, each adapted to receive a data signal at one of a first or second logic level, an output node, a reference voltage source, means operatively connected to said output node for charging said output node to said first logic level during said first clock interval, first switch means operatively connected to said output node and having a control terminal, said first switch means adapted to be closed by the application of said reference voltage to its control terminal and effective when closed to discharge said output node to said second logic level, and second switch means operatively connected to said first switch means and to said one or more data input nodes and controlled by the logic configuration of said one or more data input nodes and effective, in response to a predetermined logic configuration of said data input, to operatively connect said first switch means to said reference voltage source during said second clock interval.

2. The circuit of claim 1, wherein said data input comprises a single data input node, and said second switch means comprises a single switch device by having its control terminal connected to said data input node.

3. A shift register comprising first and second circuits in accordance with claim 2, connected in series, the output node of said first circuit being connected to the input node of said second circuit, said first and second clock intervals of said second circuit being nonoverlapping with said first and second clock intervals of said first circuit.

4. The circuit of claim 1, wherein said firs and second clock intervals are defined by first and second control voltage sources having first and second timed clock pulses at said reference voltage level, said first interval being defined by the overlapping portion of said pulses, said second interval being defined by the nonoverlapping portion of said second clock pulse, said first and second switch means comprising first and second switching devices respectively, each having two output circuit terminals and a control terminal adapted to close its output circuit upon the application thereto of said reference voltage, the control terminal of said second switch device being connected to said data input node, the output circuit terminals of said second switch device being connected between said second control voltage source and the control terminal of said first switch device, the output circuit terminals of said first switch device being connected between said first control voltage source and said output node.

5. The circuit of claim 1, wherein said data input comprises a plurality of data input nodes and said second switch means comprises a plurality of switch devices each having two output circuit terminals and a control terminal adapted to close its output circuit upon the application thereto of a voltage at said first logic level and to open its output circuit upon the application thereto of a signal at said second logic level, and the control terminal of each of said switch devices being connected to one of said data input nodes.

6. The circuit of claim 5, wherein said first and second clock intervals are defined by first and second control voltage sources having first and second timed clock pulses at said reference voltage level said first interval being defined by the overlapping portion of said pulses, said second interval being defined by the nonoverlapping portion of said second clock pulse, said first switch means comprising a single switching device, having two output circuit terminals and a control terminal adapted to close its output circuit upon the application thereto of said reference voltage, the output circuit terminals of said single switch device being connected between said first control voltage source and said data output node, the output circuit terminals of said plurality of switch devices are connected in series between said second control voltage source and the control terminal of said single switch device.

7. The circuit of claim 5, wherein said first and second clock intervals are defined by first and second control voltage sources having first and second timed clock pulses respectively at said reference voltage level, said first interval being defined by the overlapping portion of said pulses, said second interval being defined by the nonoverlapping portion of said second clock pulse, said first switch means comprising a single switching device, having two output circuit terminals and a control terminal adapted to actuate said single switching device upon the application thereto of said reference voltage, the output circuit terminals of said single switch device being connected between said first control voltage source and said data output node, the output circuit terminals of said plurality of switch devices are connected in parallel between said second control voltage source and the control terminal of said single switch device.

8. A shift register comprising first and second circuits in accordance with claim 4, connected in series, the output node of said first circuit being connected to the input node of said second circuit, said first and second clock intervals of said second circuit being nonoverlapping with said first and second clock intervals of said first circuit.

9. A shift register comprising first and second circuits each in accordance with claim 8, the data output node of said first circuit being connected to said data input node of said second circuit, said clock pulses of said second circuit being subsequent to and nonoverlapping with said pulses of said first circuit.

10. The circuit of claim 8, wherein said pulses of said first and second control voltage sources begin substantially simultaneously, said pulse of said second control voltage source being of greater duration than said pulse of said first control voltage source.

11. A logic circuit comprising first, second and third electronic switch devices, each having two output circuit terminals and a control terminal, a data input node, first and second control voltage sources having overlapping timed clock pulses, said pulses being operatively effective to actuate said switch devices when switch device being connected between said first control voltage source and said data output node, the output circuit terminals of said plurality of switch devices are connected in series between said second control voltage source and the control terminal of said single switch device.

12. The circuit of claim 9, wherein said pulses of said first and second control voltage sources begin substantially simultaneously, said pulse of said second control voltage source being of greater duration than said pulse of said first control voltage source.

13. A shift register comprising first and second circuits each in accordance with claim 12, the data output node of said first circuit being connected to said data input node of said second circuit, said clock pulses of said second circuit being subsequent to and nonoverlapping with said pulses of said first circuit.

14. A logic circuit comprising a data input comprising a plurality of data input nodes, first and second control voltage sources having overlapping timed clock pulses, a data output node, first and second electronic switch devices, each having two output circuit terminals and a control terminal, the control terminal and one of said output terminals of said first switch device being connected to said first control voltage source, the other output terminal of said first switch device being connected to said output node, the output terminals of said second switch device being connected between said output node and said first control voltage source, a plurality of electronic switch devices each having two output circuit terminals and a control terminal, the output terminals of said plurality of switch devices being connected in series between said second control voltage source and the control terminal of said second switch device, the control terminals of said plurality of switch devices being connected respectively to said plurality of data input nodes.

15. A logic circuit comprising a data input comprising a plurality of data input nodes, first and second control voltage sources having overlapping timed clock pulses, a data output node, first and second electronic switch devices, each having two output signal terminals and a control terminal, the control terminal and one of said output terminals of said first switch device being connected to said first control voltage source, the other output terminal of said first switch device being connected to said output node, the output terminals of said second switch device being connected between said output node and said first control voltage source, a plurality of electronic switch devices each having two output circuit terminals and a control terminal, the output terminals of said plurality of switch devices being connected in parallel between said second control voltage source and the control terminal of said second switch device, the control terminals of said plurality of switch devices being connected respectively to said plurality of data input nodes.

16. A logic circuit having a plurality of identical subcircuits each having an input node adapted to receive a data signal at one of a first or second logic level, an output node, the output node of the first subcircuit being operatively connected to the input node of the second subcircuit, the output node of the second subcircuit being operatively connected to the input node of the third subcircuit, and so on, said subcircuits being adapted to perform a logic operation on a data signal during a period defined by first, second and third clock intervals, a given subcircuit comprising means operatively connected to said output node for charging said output node to said first logic level during said first clock interval, and an electronic switching device having an output circuit and a control terminal effective when charged to said first logic level to close its output circuit, the output circuit of said switching device being connected to said output node and effective when closed to discharge said output node to said second logic level, and means operatively connected to said control terminal of said switching device and to said input node and effective to conditionally charge said control terminal to said first logic level during said second clock interval in response to the logic level of the signal at said data input node and to unconditionally discharge said control terminal to said second logic level during said third clock interval.

17. The circuit of claim 16, wherein said first, second and third clock intervals are defined by first, second and third control voltage sources having first, second and third timed clock pulses, respectively, at said reference voltage level, said first interval being defined by the overlapping portion of said first and second clock pulses, said second interval being defined by the nonoverlapping portion of said second clock pulse, and said third interval being defined by said third clock pulse, said charge and discharge means comprising a second electronic switching device having its output circuit connected between the control terminal of said first switching device and said second control voltage source.

18. The circuit of claim 16 wherein the control terminal of said second switching device of said given subcircuit is connected to the output node of the previous subcircuit and wherein the output node of said previous subcircuit is charged to said first logic level during said third clock interval.

* * * * *